United States Patent Office 3,312,613
Patented Apr. 4, 1967

3,312,613
SUBSTITUTED HALOHEPTENES
Victor Mark, Olivette, Mo., assignor to Monsanto Company, St. Louis, Mo., a corporation of Delaware
No Drawing. Filed Oct. 18, 1962, Ser. No. 231,559
3 Claims. (Cl. 204—163)

This invention relates to novel biologically active compounds having useful properties as are described hereinafter. The new compounds are derivatives of hexachlorocyclopentadiene with quite distinguishable physical and chemical properties. More specifically, the invention relates to procedures involving the Diels-Alder derivatives of the said hexachlorocyclopentadiene and to compounds prepared by subsequent chemical reactions.

By the reaction of hexachlorocyclopentadiene and allene or by the dehydrohalogenation of the hexachlorocyclopentadiene-allylhalide adduct a useful intermediate in the preparation of the novel compounds described more fully below and claimed hereinafter is obtained. It has been found that the said intermediate 1,2,3,4,7,7-hexachloro-5-methylene-2-norbornene may be reacted with elemental chlorine or bromine whereby the following reaction takes place:

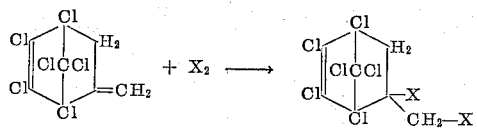

wherein X is selected from the class consisting of chlorine and bromine.

The reaction is effected by contacting the 1,2,3,4,7,7-hexachloro-5-methylene-2-norbornene with bromine or chlorine directly or dissolved in a suitable inert organic solvent. The preferred solvents are benzene, paraffinic hydrocarbons and halogenated alkanes such as carbon-tetrachloride, chloroform, methylenechloride, dichloroethane, ethylene dibromide, bromoform and methylene bromide. The reaction proceeds at room temperature in the presence of actinic light and can be completed by concluding the reaction at a higher temperature, such as the reflux temperature of the solvent.

Further details are set forth in the following specific examples.

Example 1

A solution of 13.5 grams of 1,2,3,4,7,7-hexachloro-5-methylene-2-norbornene in 30 ml. of methylene chloride was saturated with chlorine until the yellow color of the excess chlorine persisted. Evaporation of the solvent left 16.2 grams of a colorless liquid residue, having an index of refraction $n_D^{23}$ 1.5692. A 98% yield of the adduct was produced and identified as comprising the structure

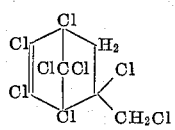

Example 2

A solution of 1,2,3,4,7,7-hexachloro-5-methylene norbornene was dissolved in methylene dibromide and liquid bromine added in approximately stoichiometric proportion. The bromine was quantitatively consumed and the product obtained as a thick oil which crystallized upon standing. Elemental analysis and infrared spectroscopy indicated the presence of a compound of the structure.

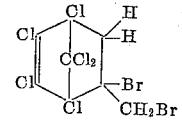

Example 3

The composition of Example 1 was found to be a significant insecticide: 90% kill of mosquito larvae was observed at a concentration of one part per million. This compound was found to be a useful bactericide for *Staphylococcus aureaus*, complete control being effected up to one part in 10,000. The compound was also found to be a significant herbicide. An application of 25 pounds per acre was sufficient to produce severe preemergent inhibition for crab grass and pig weed.

The new compounds may be used in a wide variety of compositions in solutions, dispersions or as pulverulent formulations. They may be prepared as concentrates or as dilute dispersions.

Furthermore, the preparation of liquid formulations may take place just prior to use by dispersing in the available water to the extent desired. Since concentrated dispersions may exceed the water solubility of the active component, it is frequently desirable to avoid local excesses of active components by providing agents which assure the complete and uniform dispersion of the formulation components. Suitable agents are the surface active agents, which may be cationic, anionic, nonionic or those which possess both cationic and anionic properties.

The surfactants may contain both hydrophilic and hydrophobic functions and thereby are in part attracted to water and still have water repellent properties. The oil-soluble components are attracted by one function which is water repellent and in this manner, local concentrations of the formulation components are avoided. Examples of the surface active agents include conventional soaps, such as the water-soluble salts of long chain carboxylic acids, the amine soaps, such as the amine salts of long chain carboxylic acids, the sulfonated animal, vegetable and minerial oils, quaternary salts of high molecular weight acids, resin soaps, such as salts of abietic acid, sulfuric acid salts of high molecular weight organic compounds, algin soaps, ethylene oxide condensated with fatty acid, alkyl phenols and mercaptans, and other simple and polymeric compositions having both hydrophilic and hydrophobic functions so as to enable the mixing of otherwise immiscible ingredients. Other examples are described in detail in the textbook, "Surface Active Agents and Detergents," Schwartz, Perry and Berch (Interscience Publishers Inc., New York, 1958).

The above described surfactants are particularly useful in aqueous formulations which have a heterogeneous component that must be maintained in dispersed condition. The heterogeneous component may be a water-immiscible organic solvent which will aid in the dissolution of the water-insoluble excess of active component or other extraneous or collateral component of the formulation. The organic solvent may be present in the amount of 0.05 to 10 percent by weight of the final formulation, depending upon the quantity of undissolved substance present. The conventional liquid formulation will usually have from 0.5 to 2 percent of the organic solvent. Suitable organic solvents for the active components are the water-immiscible organic alcohols, ketones and hydrocarbons, for example isopropanol, benzene, acetone, methyl ethyl ketone, kerosene, and chlorinated hydrocarbons. The proportions of such organic liquid additives will depend upon the solubility properties of the active ingredient and may require as little as one percent or as much as 20 percent in order to provide a uniform distribution within the formulation, which is capable of maintaining its distributed state during storage, use and after application to the soil or plant surfaces.

Aqueous formulations may contain solid substances when the formulation is prepared by adding a wettable dust to water. In order to suspend the larger quantity of water insoluble solids more of the surfactant is usually required, for example 1.0 to 10 percent. The solid component of the wettable powders, in addition to providing a carrier for the concentrates, will serve as an indicator in the final formulation to permit the visual estimation of the area and the weight of coverage. Solid substances will retain the active component by occlusion and will often have better adhesion to the foliage being treated. The solid carriers for use in solid pulverulent compositions, either as concentrates or as treating formulations, contain surfactants to prevent local high concentrations and to facilitate distribution on the insect-infested environment. Suitable solid diluents are those which render the compositions permanently dry and free flowing. Thus, hygroscopic materials are to be avoided unless the compositions also contain a separate substance to serve as an aid to the flowability. Effective solid diluents, preferably pulverulent or granular in form so as to be effective carriers for the active ingredient are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the entire formulation as applied to the soil or to plant surfaces.

Although the invention is described with respect to specific modifications, the details thereof are not intended to be limitations on the scope of the invention except to the extent incorporated in the appended claims.

What is claimed is:

1. The method of preparing a compound of the structure

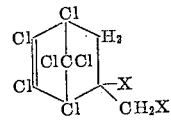

wherein X is selected from the group consisting of chlorine and bromine, which comprises contacting 1,2,3,4,7,7-hexachloro-5-methylene-2-norbornene with a halogen of the group consisting of chlorine and bromine in the presence of actinic light.

2. The method of preparing 5-bromo-1,2,3,4,7,7-hexachloro - 5 - bromomethyl - bicyclo - [2.2.1]hept - 2 - ene, which comprises contacting bromine and 1,2,3,4,7,7-hexachloro-5-methylene-bicyclo-[2.2.1]hept-2-ene in the presence of actinic light.

3. The method of preparing 1,2,3,4,7,7-heptachloro-5-chloromethyl norbornene which comprises contacting chlorine and 1,2,3,4,7,7-hexachloro-5-methylene norbornene in the presence of actinic light.

References Cited by the Examiner

UNITED STATES PATENTS

| 2,806,813 | 9/1957 | Hanbein | 260—648 X |
| 2,912,356 | 11/1959 | Schmerling | 260—648 X |
| 3,062,898 | 11/1962 | Hock | 260—648 |

OTHER REFERENCES

Johnson et al.: "Journal Org. Chem.," vol. 26, pp. 4105–6 (1961).

Riemschneider et al.: "Monatsh. fur Chemie," vol. 92, pp. 1070–4 (1961).

HOWARD S. WILLIAMS, *Primary Examiner.*

LEON ZITVER, *Examiner.*

K. H. JOHNSON, *Assistant Examiner.*